(12) United States Patent
Kereth et al.

(10) Patent No.: US 10,739,369 B2
(45) Date of Patent: Aug. 11, 2020

(54) DEVICE AND METHOD FOR ACCURATE WIND MEASUREMENT

(71) Applicant: FIRST AIRBORNE LIMITED, Ein Vered (IL)

(72) Inventors: Yefim Kereth, Rehovot (IL); Boaz Peled, Ein Vered (IL)

(73) Assignee: FIRST AIRBORNE LIMITED, Ein Vered (IL)

( * ) Notice: Subject to any disclaimer, the term of this patent is extended or adjusted under 35 U.S.C. 154(b) by 188 days.

(21) Appl. No.: 16/083,257

(22) PCT Filed: Mar. 8, 2017

(86) PCT No.: PCT/IL2017/050282
§ 371 (c)(1),
(2) Date: Sep. 7, 2018

(87) PCT Pub. No.: WO2017/153987
PCT Pub. Date: Sep. 14, 2017

(65) Prior Publication Data
US 2019/0094255 A1 Mar. 28, 2019

(30) Foreign Application Priority Data
Mar. 9, 2016 (IL) .......................................... 244503

(51) Int. Cl.
*G01P 5/02* (2006.01)
*F03D 17/00* (2016.01)
(Continued)

(52) U.S. Cl.
CPC ................ *G01P 5/02* (2013.01); *F03D 17/00* (2016.05); *G06T 7/20* (2013.01); *G06T 7/70* (2017.01); *G06T 2207/30252* (2013.01)

(58) Field of Classification Search
CPC ... G01P 5/02; F03D 17/00; G06T 7/70; G06T 7/20; G06T 22/30
(Continued)

(56) References Cited

U.S. PATENT DOCUMENTS

| 4,152,933 A | 5/1979 | Woodhouse |
| 4,449,400 A | 5/1984 | Singh |

(Continued)

FOREIGN PATENT DOCUMENTS

| DE | 8814788 U1 | 1/1989 |
| JP | S-59136658 A | 8/1984 |

(Continued)

OTHER PUBLICATIONS

H. P. Gunnlaugsson et al., "Telltale Wind Indicator for the Mars Phoenix Lander," Journal of Geophysical Research, vol. 113, No. null, Jan. 1, 2008.

(Continued)

*Primary Examiner* — Jewel V Dowtin
(74) *Attorney, Agent, or Firm* — Moser Taboada

(57) ABSTRACT

A device for accurate wind measurement includes a bench carrying a camera having camera optics and a moving object connected to the camera by a string. The camera is generally directed downward and takes images of the object's movement while influenced by gravity and aerodynamic forces and is configured to stream the images to a digital signal processor or computer, which is adapted to decode the images and compute the object location and spatial angles.

17 Claims, 4 Drawing Sheets

(51) Int. Cl.
    *G06T 7/20* (2017.01)
    *G06T 7/70* (2017.01)
(58) Field of Classification Search
    USPC .......................................... 73/170.01, 170.02
    See application file for complete search history.

(56) References Cited

U.S. PATENT DOCUMENTS

| | | | |
|---|---|---|---|
| 10,354,407 B2* | 7/2019 | Lablans | ................... G01C 3/06 |
| 10,475,239 B1* | 11/2019 | Priest | ................... H04L 41/145 |
| 2014/0163884 A1 | 6/2014 | Lilien et al. | |

FOREIGN PATENT DOCUMENTS

| | | | |
|---|---|---|---|
| JP | 2005345180 A | 12/2005 | |
| WO | WO-2013111429 A1 | 8/2013 | |

OTHER PUBLICATIONS

Extended European Search Report dated Mar. 21, 2019 for Application No. 17762638.9.
International Search Report dated Jul. 3, 2017 for PCT Application No. PCT/IL2017/050282.
Written Opinion of the International Searching Authority dated Jul. 3, 2017 for PCT Application No. PCT/IL2017/050282.

* cited by examiner

DEVICE AND METHOD FOR ACCURATE WIND MEASUREMENT

FIELD OF THE INVENTION

The present invention relates to an accurate wind measurement device and method, and more particularly, to a device and method for accurate wind measurement onboard an aerial vehicle.

BACKGROUND OF THE INVENTION

It is a common practice to utilize aerial vehicles for measurement of various environmental parameters. Typical wind measurement devices onboard aerial vehicles, particularly helicopter or multi-rotors, are affected by the vehicle's body or propulsion systems, and therefore have a limited level of accuracy. Due to the high distribution and increasing utility of low-cost small and medium size aerial vehicles (UAVs), there are evident benefits to a compact, low-weight and accurate wind measurement device, capable of being carried by these type of vehicles. One of several possible applications is the external performance monitoring of wind-turbine power production. The ability to position the accurate wind measurement device according to the invention directly in front of wind turbine rotors enables wind resource characteristics (predominantly direction and speed) detected by the measurement instrumentation mounted on the wind turbines (the logged data of which are often biased due to the positioning of the instruments behind the rotor-blades) to be compared with the data taken by an external, unbiased device, mounted on an unmanned aerial vehicle. The device's better accuracy enables corrections to the alignment of the wind turbine nacelle towards the prevailing wind direction among other corrections, thereby optimizing power production. The scale, mobility and autonomous capabilities of unmanned aerial vehicles carrying the device enable scheduled, sporadic, unmanned and on-demand, external and unbiased power production performance monitoring of wind turbines. This enables constant monitoring and immediate or post flight corrections to the wind turbine alignment, all of which capabilities are currently non-existent and very much required.

SUMMARY OF THE INVENTION

The present invention describes an accurate wind measurement device carried by an aerial vehicle.

The wind measurement is based on the photographing of an object's behavior under the force of gravity and the aerodynamic force generated by the wind. The behavior of some predefined shapes (e.g. sphere) has been widely explored, and has a broad theoretical basis. Such behavior, once calibrated against other high accuracy measurement technologies, can provide a valid and accurate measurement.

In accordance with the present invention provided herein are a device and method for accurate wind measurement, which are the subject matter of independent claims presented below.

The device deploys an object that is carried by a low cross-section string. The deployment space of the object is continuously monitored by a camera, thus enabling measurement of the string's spatial angles relative to the axis of the camera's optics. The string length, defined as a distance between the object and the camera's sensor, allows calculating the accurate location of the object relative to the camera sensor. The object location measured by the camera based on the string length, is then converted into the aerodynamic forces (e.g. drag) vector generated by the wind. The string tension is continuously measured in order to deduce the aerodynamic forces in the vertical and horizontal planes. The weighted result of the horizontal and vertical aerodynamic forces provides a well-defined wind speed spatial vector. The object can be of different aerodynamic shapes (e.g. sphere), or can be an anemometer of any known technology, to provide dual technology measurement.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Figure 1:
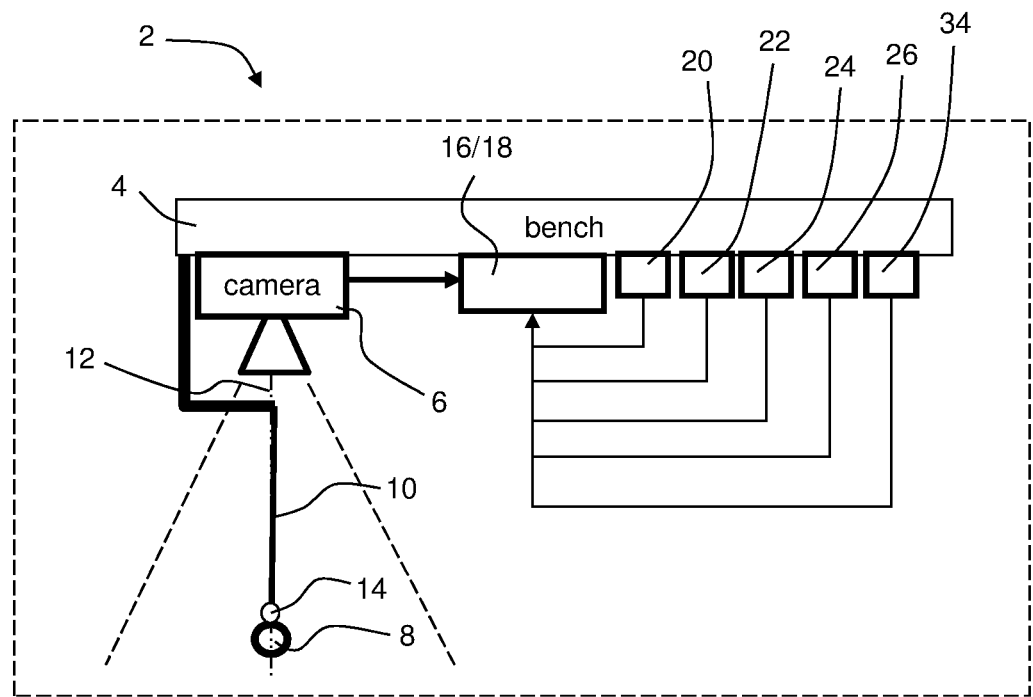
FIG. 1 is a schematic diagram of a basic device according to an embodiment of the invention.
Figure 2:
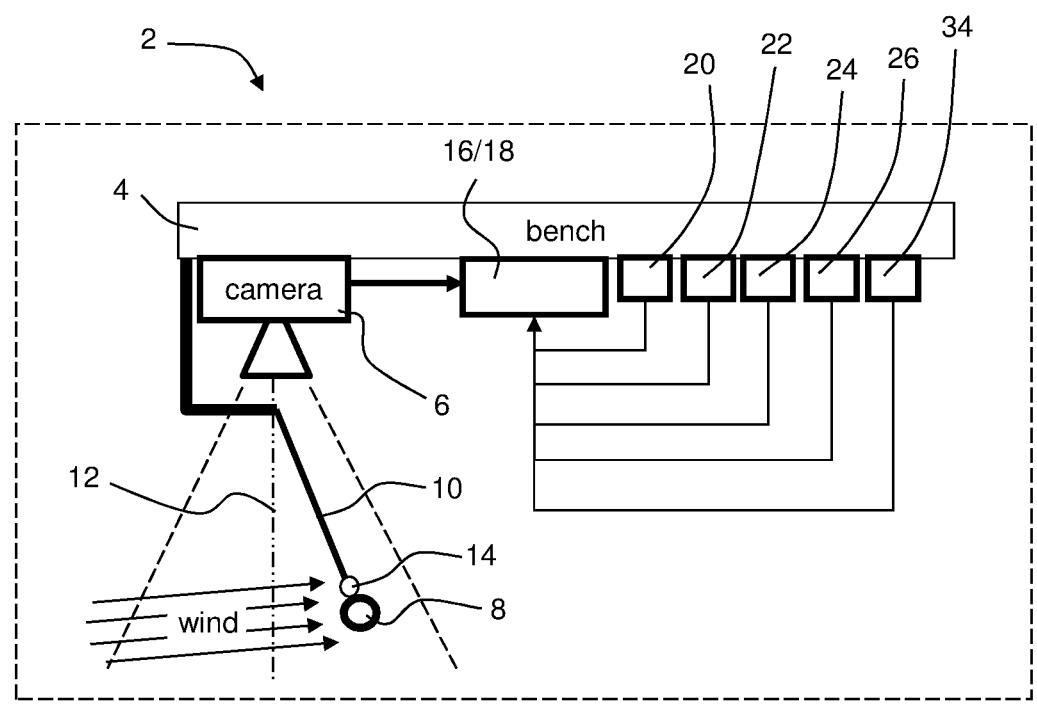
FIG. 2 is a schematic diagram of a basic device according to an embodiment of the invention under the influence of gravity and aerodynamic forces.
Figure 3:
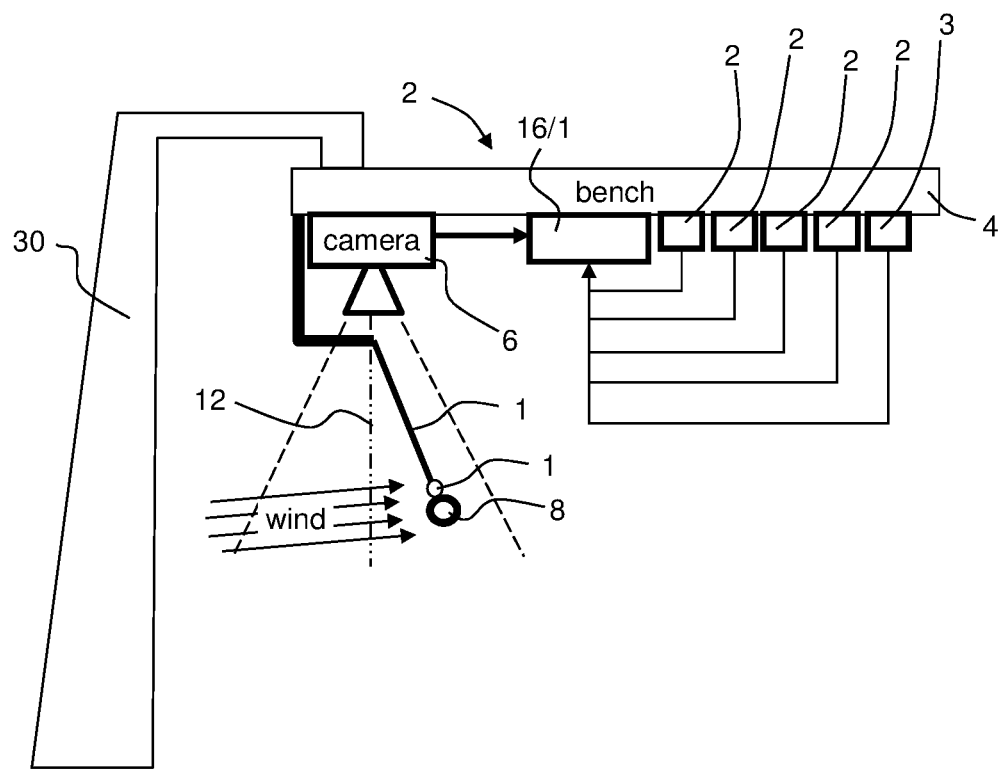
FIG. 3 is a schematic diagram of a basic device according to an embodiment of the invention, carried by a mast.
Figure 4:
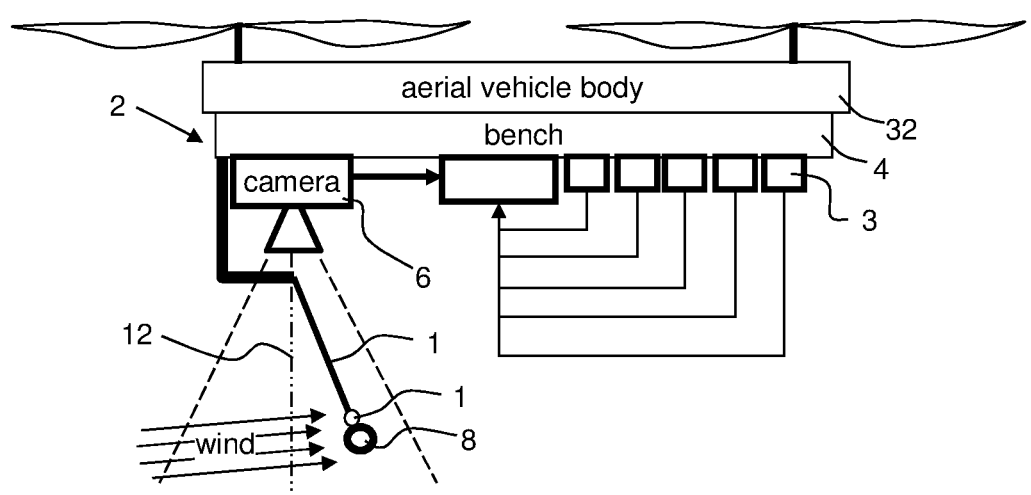
FIG. 4 is a schematic diagram of a basic device according to an embodiment of the invention, carried by an aerial vehicle.
Figure 5:
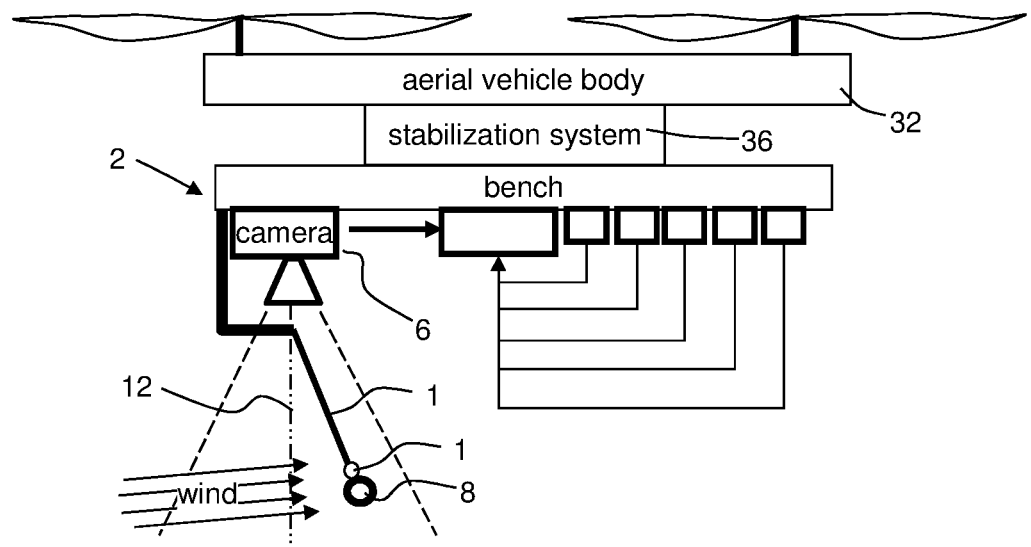
FIG. 5 is a schematic diagram of a stabilized device according to an embodiment of the invention.

FIGS. 1 and 2 are schematic diagrams of a basic wind measurement device shown generally as 2 having a bench 4 carrying a camera 6 which is generally directed downward and monitoring the position of a remote object 8 impacted by gravity and aerodynamic forces, generated by the wind and/or airflow (FIG. 2). Object 8 has a predefined aerodynamic shape, preferably a sphere, at least indirectly connected to the bench 4 by a low cross-section string 10 of predefined length. At the upper side, string 10 is crossing the centerline 12 of the camera optics. The string 10 tension is measured by the tension sensor 14, which may be located directly along the string 10, at the upper side or close to the object 6 (as shown in FIG. 1), or indirectly, elsewhere (not shown). The video signal of camera 6 streams to a digital signal processor (hereinafter: "DSP") 16 or to a computer 18. DSP 16 or computer 18 is connected to a temperature sensor 20 and a pressure sensor 22, both measuring the ambient air conditions. In addition, DSP 16 or computer 18 is connected to a compass 24 and to GPS 26, in order to define the bench location and azimuth. The algorithm (not shown) running onboard the DSP 16 or computer 18 has inputs of location from GPS 26, azimuth from compass 24, altitude and air pressure from pressure sensor 22, ambient temperature from temperature senor 20 and string 10 length. The algorithm 28 decodes the images taken by the camera 6 and based on the string 10 length finds the location of the object 8, relative to the camera 6, and calculates the string 10 spatial angles. Tension sensor 14 measures the tension of string 10, which is needed in order to balance the object 8 against the gravity and aerodynamic forces. The tension force vector can be represented by horizontal and vertical forces. These forces are calculated by the algorithm 28 based on length of the string 10 and the spatial angle, which are generated by the algorithm's 28 decoding of the camera 6 images. Now, knowing the weight of the object 8 and the length of the string 10, and spatial angles, the aerodynamic forces in the vertical and horizontal planes can be calculated. The vertical and horizontal aerodynamic forces are calculated based on the following inputs: (a) spatial angle of the string 10; (b) length of the string 10; (c) tension force in the string 10 measured by sensor 14; (d) weight of the object 8. The aerodynamic force vector is the weighted result of both the horizontal and vertical forces. The aerodynamic force vector can be converted to a wind vector (airflow vector) based on look-up tables generated via the calibration of the device 2 measurements against the measurements of other high accuracy measurement technology or based on a mathematical model, or based on the merging of both. To achieve accurate measurements based on the abovementioned description, the centerline 12 of the camera optics should be perpendicular to the ground collinear with the gravity force vector (hereinafter: "first condition"). Alternatively, the spatial angle of the centerline 12 of the camera optics relative to the gravity force vector should be measured and the spatial angle of the string 10 should be corrected based on this measurement (hereinafter: "second condition"). Whenever device 2 is static and coupled for example, to the top of mast 30 (FIG. 3), the first condition may be simply achieved by calibrating the centerline 12 of the camera optics to fit the gravity force vector. Whenever device 2 is mobile and coupled for example, to an aerial vehicle body 32 (FIG. 4), the second condition may be simply achieved by measuring the centerline of the camera optics relative to the gravity force vector by the sensor 34 (e.g. three axis gyro or any other suitable sensor based on any appropriate technology). Another option to allow operation of the device 2 while coupled to the aerial vehicle body 32 is by stabilizing the centerline of the camera optics in order to meet the first condition. This can be done either by the existing stabilization capability of the aerial vehicle, as is shown in FIG. 4, or by a stabilization system 36, as is shown in FIG. 5. In this case, one side of the stabilization system 36 is coupled to the vehicle body 32, and the other side is coupled to the bench 4 of the device 2.

To fit the aerial vehicle characteristics, the length of string 10 and the parameters of the object 8 should be optimized. For example, large and powerful aerial vehicles will require a longer string 10 to minimize the aerial vehicle impact (e.g. propellers airflow, which can reduce the measurement accuracy) on the object 8 of device 2.

Figure 6:
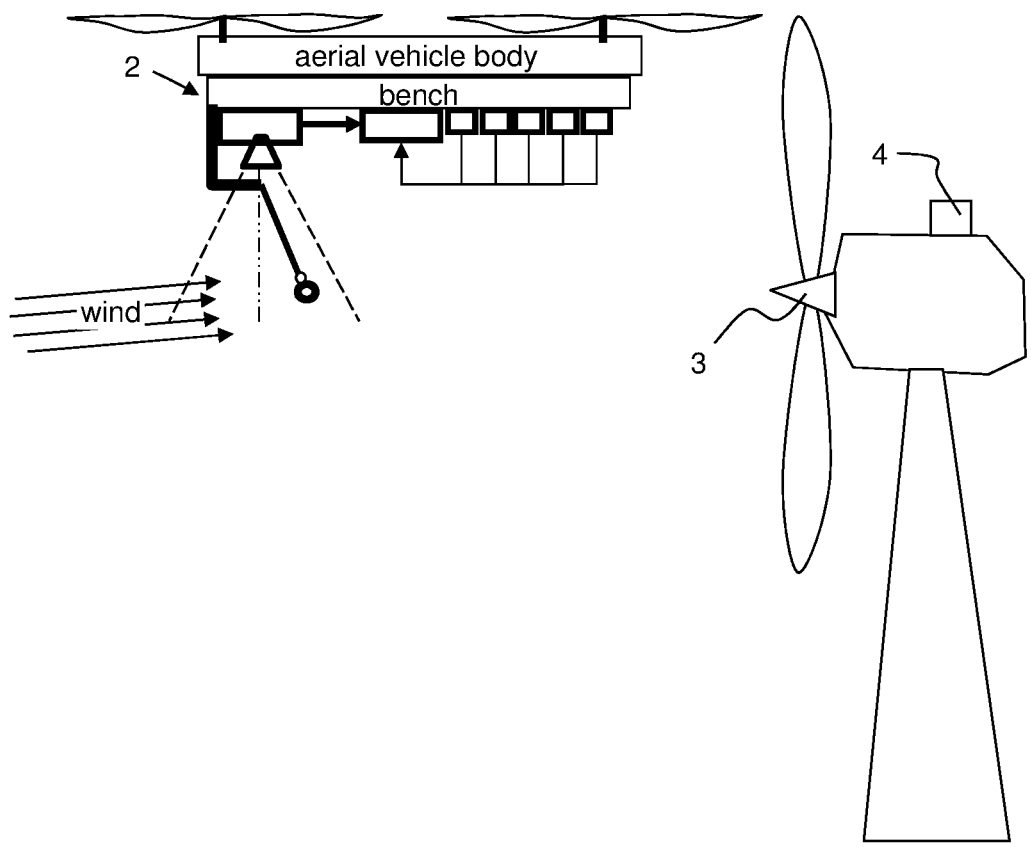
FIG. 6 is a schematic diagram of a device carried by an aerial vehicle monitoring the wind resources in front of the rotor of a wind turbine.

To monitor the power production performance of a wind turbine generator, the device 2 can be positioned directly in front of a wind turbine rotor 38, to enable comparison of the wind resource characteristics (predominantly, direction and speed) detected by the commonplace measurement instruments 40 mounted behind the wind turbine rotor 38 (FIG. 6). The data received from the instruments 40 are often biased due to their positioning behind the rotor 38 and the resulting influence of the rotor on the wind flow. By comparing the instruments 40 detected data against the data accumulated by the device 2 coupled to the vehicle body 32, the alignment of the rotor 38 towards the prevailing wind direction can be corrected, thus enabling optimal power production.

The scale and mobile potential of the device 2 in the case at hand, will enable periodic, sporadic, unmanned, on demand, external non-biased performance monitoring of wind turbines-capability, currently non-existent and very much required.

Figure 7:
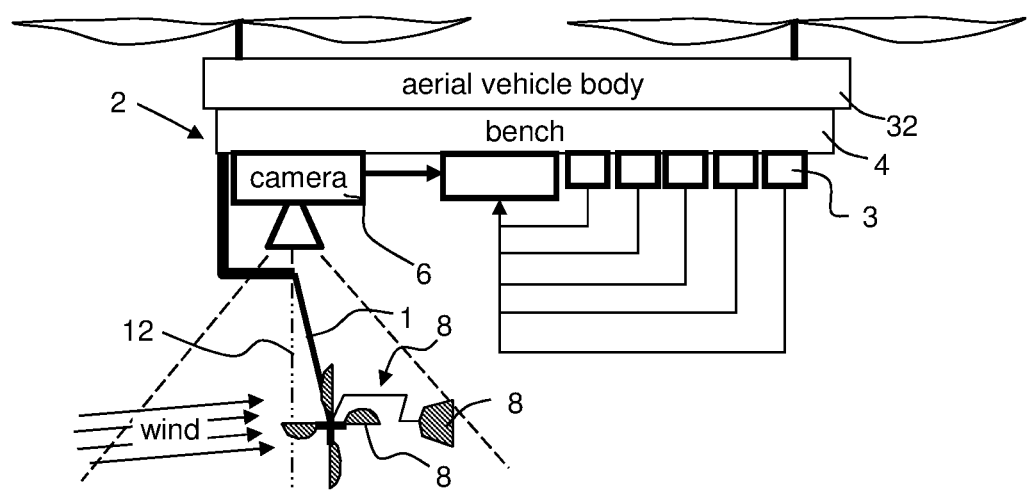
FIG. 7 is a schematic diagram of dual technology measurement device according to an embodiment of the invention, carried by an aerial vehicle.

Whenever higher level of accuracy and confidence is required, dual technology measurement can be implemented based on the above-mentioned device and method. In device 2, shown in FIG. 7, the object 8 is an anemometer of any known technology (e.g. cup anemometer 8*a* with wind vane 8*b*). In this case, object 8 provides two types of measurements: first, based on the above-mentioned description; second, direct readings from anemometer 8*a*. The merge of two types of measurements allows achieving higher level of accuracy and confidence. The direction of anemometer 8*a* is controlled by the wind vane 8*b*, and therefore can be monitored by the camera 6. This direction can be measured by the algorithm 28 and can be used as an additional, independent measurement.

It should be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be applicable to all other embodiments also.

The invention claimed is:

1. A device for accurate wind measurement, the device comprising:
    a bench carrying a camera having camera optics;
    a moving object connected to said camera by a string;
    said camera being generally directed downward and taking images of said object's movement while influenced by gravity and aerodynamic forces;
    said camera being configured to stream the images to a digital signal processor or computer, and
    said digital signal processor or computer being adapted to decode the images and compute the object location and spatial angles.

2. The device as claimed in claim 1, wherein said object has a predefined aerodynamic shape, preferably spherical.

3. The device as claimed in claim 1, wherein said string is of a low cross-section.

4. The device as claimed in claim 1, wherein said string is of predefined length.

5. The device as claimed in claim 1, wherein an upper side of said string crosses the centerline of the camera optics.

6. The device as claimed in claim 1, wherein the string is at least indirectly connected to a tension sensor.

7. The device as claimed in claim 1, wherein said DSP or computer is connected to any one or more in a group consisting of a temperature sensor, a pressure sensor and a compass.

8. The device as claimed in claim 1, wherein said DSP or computer is connected to a GPS.

9. The device as claimed in claim 1, wherein said DSP or computer is connected to a sensor adapted to measure the spatial angle between a centerline of the camera optics and the gravity force vector.

10. The device as claimed in claim 1, wherein the device is coupled to a mast.

11. The device as claimed in claim 1, wherein the device is coupled to a body of an aerial vehicle.

12. The device as claimed in claim 1, wherein the device is coupled to a stabilization system.

13. The device as claimed in claim 12, wherein the stabilization system is coupled to a body of an aerial vehicle.

14. The device as claimed in claim 1, wherein the object is an anemometer.

15. A method for accurate wind measurement, the method comprising:
coupling the device of claim 1 to an aerial vehicle;
obtaining a first input of string length;
obtaining a second input of object weight;
obtaining a third input of tension force along said string needed to balance the object against the gravity and aerodynamic forces;
obtaining a fourth input from a sensor measuring at least one physical condition;
obtaining camera images depicting movement of the aerial vehicle and decoding said images based on said first input so as calculate the location of the object relative to spatial angles of the string that connects the object to the camera, and
calculating aerodynamic force based on said location in conjunction with the second, third and fourth inputs.

16. The method as claimed in claim 15, wherein said fourth input is any one of: (i) a location from a GPS sensor, (ii) an azimuth from a compass, (iii) an altitude and air pressure from a pressure sensor, (iv) an ambient temperature from a temperature senor, (v) a spatial angle between the camera optics centerline and the gravity force vector.

17. A method of monitoring power production performance of a wind turbine, the method comprising;
positioning the device according to claim 1 in front of a rotor of said wind turbine;
measuring wind properties using the device in order to obtain first wind measurements;
comparing said first wind measurements with second wind measurements detected by conventional wind turbine wind measurement instruments;
determining wind turbine wind measurement bias based on differences between the first wind measurements and the second wind measurements; and
applying the wind properties measured by the device to a respective wind turbine power curve for said turbine in order to calculate power production loss due to wind turbine wind measurement bias.

* * * * *